April 9, 1963 D. P. SANTE 3,085,205

SEMICONDUCTOR HARMONIC GENERATORS

Filed Oct. 31, 1961

INVENTOR.
DANIEL P. SANTE

BY Spencer E. Olson

ATTORNEY 3,085,205
SEMICONDUCTOR HARMONIC GENERATORS
Daniel P. Sante, Williamsville, N.Y., assignor to Sylvania Electric Products Inc., a corporation of Delaware
Filed Oct. 31, 1961, Ser. No. 148,996
5 Claims. (Cl. 328—16)

This invention relates generally to signal generators, and is more particularly concerned with harmonic generators employing semiconductor devices as the non-linear element.

The generation of radio frequency signals in the microwave region presents peculiar problems that are not present at low frequencies, but which become severe limiting factors in the ultra-high frequency (UHF) range. Conventional tube oscillators are not suitable for UHF applications because of the shunting effects of inter-electrode capacitance and electron transit time. Vacuum-tube oscillators capable of operating up to 3,000 megacycles per second are available, but they have limited utility because their efficiency drops and their noise figures rise in that region. For this reason, frequencies in excess of 1,000 megacycles per second have usually been generated by disc-seal or "light-house" tubes, or transit-time oscillators such as the klystron. These two types are not particularly satisfactory, however, in applications where space and weight are at a premium, such as in missile or satellite electronic systems, since neither of these tubes, because of their geometric configuration, are adaptable to microminiaturization. Additionally, both of these tube types consume appreciable heater power and require a well-regulated anode supply capable of supplying several rather high operating voltages. Further, both have special cooling requirements, and both suffer reliability degradation introduced by the large number of component parts required in the system.

Many of these disadvantages are overcome by solid-state harmonic generators which are becoming increasingly popular in the microwave field. Harmonic generators allow the use of a driving frequency low enough to obtain reasonable amounts of power and also permit the use of a crystal oscillator to maintain the accuracy of the driving frequency. Harmonic generators, of which several are known to the art, consist basically of a non-linear element which when driven by a fundamental frequency signal produces many harmonics. Available solid state harmonic generators fall into two general classes: (1) the non-linear resistance type, and (2) the non-linear reactance type. The latter is inherently superior in that very little power is absorbed by the non-linear element since it is almost purely reactive and, hence, non-dissipating. Two types of variable reactance elements are currently available, the non-linear capacitor characterized by a junction diode, and the non-linear inductor of which certain ferrite materials are examples. The variable reactance diode, or varactor as it has been termed, is generally preferred because it requires much less driving power than ferrite materials, and does not require magnetic field producing means which are necessary for generating harmonics in ferrite materials.

The varactor is a PN junction which exhibits a non-linear capacitance variation with applied bias voltage. When the varactor is operated in the capacitance mode for generating harmonics, the efficiency is determined by the value of the series resistance of the varactor and the swing of the driving voltage. The lower the value of the series resistance, the more efficient the varactor becomes. The capacitive mode occurs when the diode is back-biased between the avalanche and forward breakdown voltage. Hence, if the applied voltage swings over into either region where the resistive mode occurs, the efficiency will drop since part of the power applied is converted into rectified current rather than into harmonic power. The figure of merit, or Q of the varactor, may be defined by the expression:

$$Q=\frac{1}{2\pi f R_s C} \qquad \text{Eq. (1)}$$

where $f$ is frequency, C is the capacitance at a particular bias point, and $R_s$ is the series resistance of the varactor.

The varactor can be used in two general circuit arrangements, a series circuit or a shunt circuit, to generate harmonics, the former being preferred for generating high order harmonics in the microwave region. For efficient harmonic generation with the series circuit, it is essential (1) to prevent power dissipation into the load impedance at the fundamental and unwanted harmonics, (2) to prevent power dissipation into the source impedance at all harmonic frequencies, (3) to match the input generator impedance to the reflected load at the input frequency, and (4) to match the load and the reflected input generator impedance. FIGURE 1 shows the equivalent circuit of an available circuit exhibiting these properties, consisting of an input tuned circuit 10 including a source S of fundamental driving frequency, a tuned output circuit 12 to which a load $R_L$ is connected, and a varactor 14 connected between the two tuned circuits. The output tuned circuit, which usually takes the form of a cavity, is designed to pass only the desired harmonic(s) and to short-circuit the fundamental and all unwanted harmonics, so as to prevent power dissipation in the load impedance at frequencies other than the desired harmonics. The input tuned circuit 10 is designed to be resonant at the fundamental frequency and to short out all harmonics so as to prevent power dissipation in the source at the harmonic frequencies. By proper selection of D.C. bias, the operating point of varactor 14 can be positioned for best efficiency, and by using matching sections between the input and output circuits it is possible to match them to the low impedance of the varactor.

The output circuit 12 may take a variety of known forms, the choice depending largely upon the nature of the transmission system in which it is intended to use the harmonic generator. If hollow waveguide is used, its cross-sectional dimensions can be selected to transmit the desired harmonics while filtering out the fundamental and unwanted harmonics. If coaxial transmission lines are used, stub supports can be used as filters to remove the fundamental drive frequency and the first few harmonics. Alternatively, in coaxial line systems, a tuned coaxial cavity, having a tuning stub for adjusting its resonant frequency, finds convenient application, and it is with this type of structure that the present invention is concerned.

Referring to FIGURE 2, the well-known coaxial cavity includes an outer cylindrical shell 16 formed of conductive material, a central conductive tuning stub 18, the amount of insertion of which can be controlled by an adjusting screw 20 accessible from outside the cavity. Wave energy is coupled into the cavity via an input coaxial line 22 the center conductor of which is formed into a loop 26 which projects into the cavity to afford inductive coupling, the end of the loop being conductively secured to the inner wall of the cavity 16. Energy is extracted from the cavity by a similar output coupling loop 28 which is coupled to an output coaxial line 30.

In previous attempts to use this form of cavity as the output circuit of an harmonic generator, the non-linear varactor 14 is inserted coaxially within the input line 22 with its anode connected to the input coupling loop 26. When the varactor is driven by an input fundamental frequency, the fundamental and many harmonics thereof appear at the anode, some or all of these frequencies being coupled into the cavity depending upon the coupling characteristics of the loop. In the system of FIGURE 2, the design intent has been that the varactor be shorted by the coupling loop 26 for the fundamental and unwanted harmonics, while higher order harmonics are coupled to the cavity for filtering by tuning of the stub 18. This intent has not been realized in practice, however, it having been found that with this cavity design it is difficult, if not impossible, to obtain output signals of usable amplitude at the higher order harmonics. For example, to be useful as a local oscillator, say at 1700 to 2300 megacycles per second, it is necessary to be able to extract power of the order of two milliwatts at the eighth to tenth harmonics of a fundamental driving frequency of about 200 megacycles at power levels of 50 to 100 milliwatts, a frequency and power level readily obtainable with crystal-controlled oscillators. It has also been found that when this device is adjusted for optimum power output at a particular harmonic, the circuit operation is erratic, manifested as spurious frequencies in the output coupling line. It has been found extremely difficult to suppress or filter these spurious oscillations because they are very large in amplitude, as compared to the amplitude of the wanted harmonics, and separated by only a small frequency difference from the wanted harmonics. The cause of the spurious signals is not clearly understood, but they may be due to parametric oscillations due to resonances within the cavity structure.

With an appreciation of the foregoing difficulties with available harmonic generators, it is a primary object of the present invention to provide an improved harmonic generator.

Another object of the invention is to eliminate spurious responsive in harmonic generators employing a non-linear reactive element and a coaxial cavity output circuit.

Still another object of the invention is to provide an efficient generator of higher order harmonics capable of delivering usable amounts of power.

A still further object of the invention is to provide an harmonic generator which is reliable and lends itself to microminiaturization techniques.

Briefly, these objects are attained in the otherwise advantageous varactor and tuned coaxial cavity harmonic generator by directly shorting the anode of the varactor to the wall of the cavity in advance of the input coupling loop. This short consists of a short piece of wire having a length and diameter which provides a low impedance path to ground for the fundamental frequency and for the first few harmonics of the fundamental. Thus, the wire functions as a broad band short circuit for the fundamental and the first few harmonics, whereby only the higher order harmonics are coupled into the cavity by the input coupling loop. Also, the impedance of the shorting wire for the high order harmonics is sufficiently high that most of the energy at the higher frequencies appears across the input coupling loop, thereby improving the efficiency of energy transfer at the higher order harmonics. By using this shorting wire, spurious responses are effectively suppressed or eliminated, thus eliminating erratic operation, and improving the efficiency of energy transfer to the output coupling line.

Other objects, features, and advantages of the invention will become apparent, and a better understanding of the construction and operation of the invention will be had from the following detailed description, taken in conjunction with the accompanying drawings, wherein.

Figure 1:
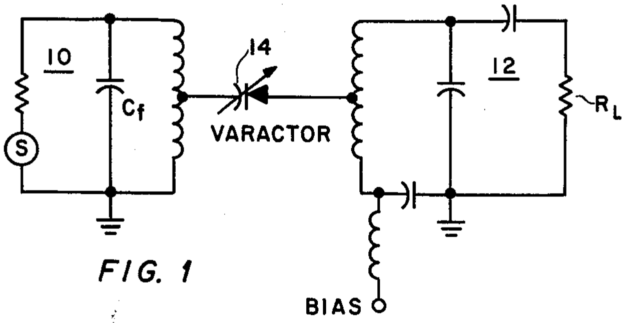
FIG. 1 PRIOR ART
FIGURES 1 and 2 are respectively an equivalent circuit of a prior art harmonic generator, and one form of known output circuit for prior art harmonic generators, to which reference has already been made.
Figures 2, 3:
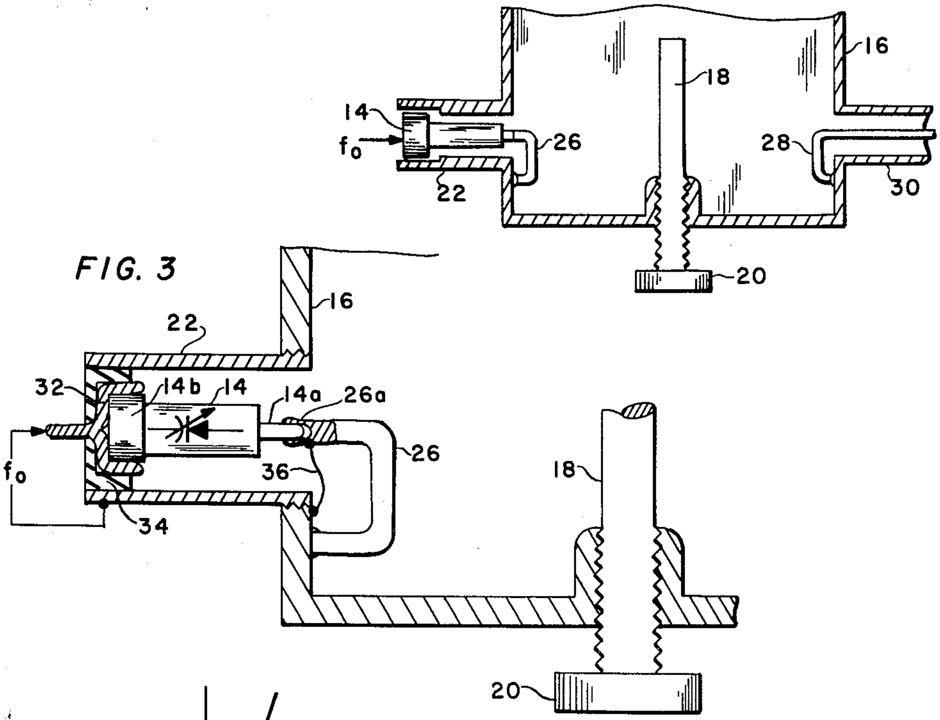
FIGURE 3 is a fragmentary elevation cross-sectional view of an harmonic generator output circuit embodying the invention.

Referring now to FIGURE 3, which is a greatly enlarged fragmentary showing of the lower left-hand corner of FIGURE 2, the varactor 14 is supported coaxially within the outer conductor of the input coaxial line 22 by inserting its anode pin 14*a* into a flared opening 26*a* in one end of the input coupling loop 26, and supporting the cathode cap 14*b* in a cup-shaped conductive structure 32 which is, in turn, supported within a block of insulating material 34, such as Teflon. As in the structure of FIGURE 2, the inner end of coupling loop 26 is conductively secured to the inside wall of the cavity 16, which is normally operated at ground potential.

Figure 4:
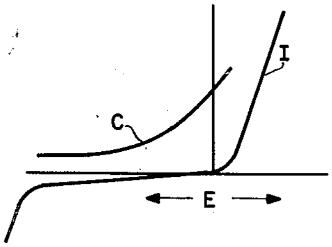
FIGURE 4 is the capacitance versus bias voltage characteristic for varactor.
Figure 5:
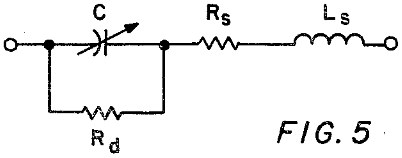
FIGURE 5 is the equivalent circuit of a varactor.

As is diagrammatically shown in FIGURE 3, the varactor is a PN junction semiconductor device which exhibits a non-linear capacitance variation with applied bias voltage, the capacitance versus voltage characteristic being shown in FIGURE 4. The equivalent circuit of a varactor is depicted in FIGURE 5, wherein $R_d$ is the diode resistance of the device, $R_s$ is its series resistance, and $L_s$ is its series inductance. For the generation of harmonics, the varactor is biased to the left of the origin so as to operate in the capacitive mode, which occurs in the region between the avalanche and forward breakdown voltage of the diode. The varactor is driven by a fundamental frequency signal of a voltage such that the swing is confined between the avalanche and forward breakdown voltages for best efficiency. When thus biased and excited, the varactor generates harmonics of the fundamental frequency $f_o$, which appear at the anode pin 14*a*. The loop 26 is of such length and diameter, and projects a distance into the cavity, such that the fundamental and some of the lower order harmonics should see a short circuit to the grounded wall of the cavity, and the higher order harmonics are coupled into the cavity. This selectivity is not always effective, however, for measurements indicate that a portion of the fundamental frequency signal is coupled into the cavity, as well as a fraction of the lower order harmonics, which, as was noted earlier, result in spurious frequencies at the output coupling loop of the cavity.

Figure 6:
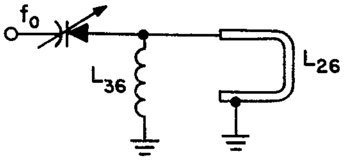
FIGURE 6 is the equivalent circuit of the structure of FIGURE 3.

In accordance with the present invention, these spurious frequencies are effectively suppressed or eliminated, and the efficiency of harmonic generation improved, by connecting a short piece of wire 36 from a point on loop 26 where it is joined to the anode pin 14*a* of the varactor to the inside wall of cavity 16. In certain configurations, the wire might be joined at its outer end to the outer conductor 22 of the input line, but in the disclosed structure, attachment to the inner wall of the cavity permits removal of cylindrical conductor 22 without disturbing wire 36. The wire extends essentially radially from the longitudinal axis of the input coupling line to the cavity wall, its length and diameter being chosen to offer a low impedance to ground for the input fundamental frequency, $f_o$. With tis inductance thus selected, it has been found to also be an effective short circuit for a number of low order harmonics, up to the third or fourth. Referring to the equivalent circuit of FIGURE 6, the piece of wire 36 acts like a choke connected in parallel with the inductance of loop 26. At the fundamental frequency and the lower order harmonics, the inductive reactance of the "choke" is very low with the result that these frequencies are shorted to ground and very little of their energy appears on loop 26. At the higher order harmonics, the inductive reactance of the wire 36 is much higher than that of coupling loop 26 with the result that most of the energy at the higher frequencies appears across the input loop 26.

Although the length and diameter of the wire is generally determined by the frequency of the fundamental driving signal, these dimensions are not critical. For a fundamental frequency of the order of 100 to 200 megacycles per second, the inductance should be of the order of 0.002 microhenries, thereby giving an inductive reactance of a few ohms. At the higher order harmonics of this fundamental frequency, say in the lower S-band, the wire exhibits a high impedance, probably due to skin effects losses and the length of the wire, rather than its inductance. Thus, nearly all the fundamental frequency and the first few harmonics are shorted at the output terminal of the varactor, but very little of the energy of the higher frequency harmonics is shorted, and, consequently, this energy appears on the input coupling loop 26 for transfer to the interior of cavity 16.

The fact that the fundamental frequency and the first few harmonics are shorted to ground in advance of the input coupling loop is believed by applicant to be the reason why the spurious frequencies are so effectively suppressed. That is, the fundamental and lower harmonics are precluded from radiating into the cavity with the result that there is no interaction of these lower frequencies with the higher order harmonics in the cavity to produce parametric oscillations. It is further believed that the efficiency of the varactor is improved by the shorting wire 36 because with the fundamental and lower harmonics shorted out immediately at the anode of the varactor, maximum current flows through the varactor since the entire driving voltage is applied across the varactor PN-junction. In the prior art structure of FIGURE 2, in which the coupling loop 26 is intended to short out the fundamental frequency, for the loop to be effective in coupling higher order harmonics to the cavity, it exhibits a relatively high impedance to the fundamental. As a result, a significant portion of the total power applied to the varactor is dissipated across the loop 26 rather than across the varactor.

When the structure of FIGURE 3 was embodied in a triple-tuned cavity (as distinguished from the single tuning stub in the illustration), good conversion efficiency and "clean" output signal were obtained. In an embodiment which has been constructed and operated, a driving frequency of the order of 150 megacycles per second at 75 milliwatts was applied to the varactor, and the caviity was capable of being tuned to derive at the output coupling loop the eleventh through the fourteenth harmonics. Without tuning adjustments other than tuning of the cavity, it was possible to extract discrete frequencies over the band 1760 to 2360 megacycles per second at power levels of approximately 1.5 milliwatts. This, it will be recognized, is adequate power for local oscillator applications, and in certain communications systems may be adequate for the transmitter power. That is, in certain applications an antenna may be coupled directly to the output line 30 and the present harmonic generator utilized as a transmitter.

From the foregoing it is seen that applicant has provided an improved harmonic generator having better efficiency than similar harmonic generators heretofore available, and capable of delivering high frequency output signals at useful power levels without spurious signals. The device is capable of delivering output signals over a wide range of frequencies, without changing the driving frequency, simply by tuning the output cavity to be resonant at the desired harmonic of the driving frequency. Of course, the power in the output signal decreases as higher order harmonics are selected, 1.5 db per harmonic, but, still, with relatively low power signals applied to the varactor, useful power levels can be derived from the output line.

Although the invention has been described as embodied in a coaxial cavity, it is to be understood that the advantages of shorting out the fundamental at the output terminal of the varactor can be realized in tunable cavities of other forms. It is applicant's intention, therefore, that the invention not be limited to what has been shown and described except as such limitations appear in the appended claims.

What is claimed is:

1. A signal generator comprising, in combination, a variable reactance diode having cathode and anode terminals, means for applying a fundamental frequency signal to the cathode of said diode, a cavity resonator tunable to desired hamonics of said fundamental frequency, an inductive coupling loop connected from the anode terminal of said diode to the wall of said resonator for coupling signal energy to said resonator, a circuit having a low impedance to said fundamental frequency and to the lower order harmonics thereof connected from the anode terminal of said diode to the wall of said resonator for effectively shorting to the wall of said resonator and preventing the appearance on said loop of signal energy at said fundamental and lower order harmonic frequencies, and means for extracting energy from said cavity resonator.

2. A signal generator comprising, in combination, a variable reactance diode having cathode and anode terminals, means for applying a fundamental frequency signal to the cathode of said diode, said diode being operative to generate harmonics of said fundamental frequency, a cavity resonator tunable to desired higher order harmonics of said fundamental frequency, means exterior of said resonator supporting said diode to position the extremity of its anode terminal substantially centrally of an opening in a wall of said resonator, a coupling loop connected from the anode terminal of said diode to the wall of said resonator and extending into said resonator for inductively coupling signal energy to said resonator, a circuit having a low impedance to said fundamental frequency and the lower order harmonics thereof connected in parallel with and in advance of said loop for effectively shorting to the wall of said resonator signal energy at said fundamental and lower order harmonic frequencies, and means for extracting energy at selected higher order harmonics as determined by the tuning of said resonator.

3. Apparatus in accordance with claim 2 wherein said circuit comprises a length of wire connected at one end to the anode of said diode and extending substantially radially therefrom and connected at the other end to the wall of said resonator.

4. Apparatus in accordance with claim 2 wherein said circuit comprises a wire connected at one end to the anode of said diode and extending substantially radially therefrom and connected at the other end to the wall of said resonator, said wire having a diameter and length to provide a relatively broadband short circuit for said fundamental and lower order harmonic frequencies.

5. In an harmonic generator including a variable reactance diode having a cathode electrode to which a driving signal of fundamental frequency is applied and an anode electrode which is inductively coupled to a cavity resonator tunable to selected higher order harmonics of said fundamental frequency, a wire connected between the anode of said diode and the wall of said resonator having a diameter and length to provide a low impedance path for said fundamental frequency and the lower order harmonics thereof, and a substantially higher impedance to higher order harmonics of said fundamental frequency.

No references cited.